Aug. 12, 1969  L. F. SCHMID  3,460,404
BRAKING DEVICES FOR DIFFERENTIAL GEARS OF MOTOR VEHICLES
Filed Sept. 20, 1966  2 Sheets-Sheet 1

INVENTOR
LEOPOLD F. SCHMID

BY *Craig & Antonelli*

ATTORNEYS

INVENTOR
LEOPOLD F. SCHMID

BY Craig & Antonelli

ATTORNEYS 3,460,404
BRAKING DEVICES FOR DIFFERENTIAL GEARS
OF MOTOR VEHICLES
Leopold F. Schmid, 49 Pischekstr.,
7 Stuttgart, Germany
Filed Sept. 20, 1966, Ser. No. 580,748
Claims priority, application Germany, Sept. 29, 1965,
Sch 37,792
Int. Cl. F16h 1/44
U.S. Cl. 74—710.5                               6 Claims

ABSTRACT OF THE DISCLOSURE

A hydraulically actuated clutch is provided drivingly between one wheel shaft and the differential gear housing, for blocking the differential gear arrangement. An anti-friction bearing is mounted between the movable element of the clutch and an annular piston mounted within the axle casing. The hydraulic system is closed and includes an operated lever for selectively actuating the clutch.

---

Figure 1:
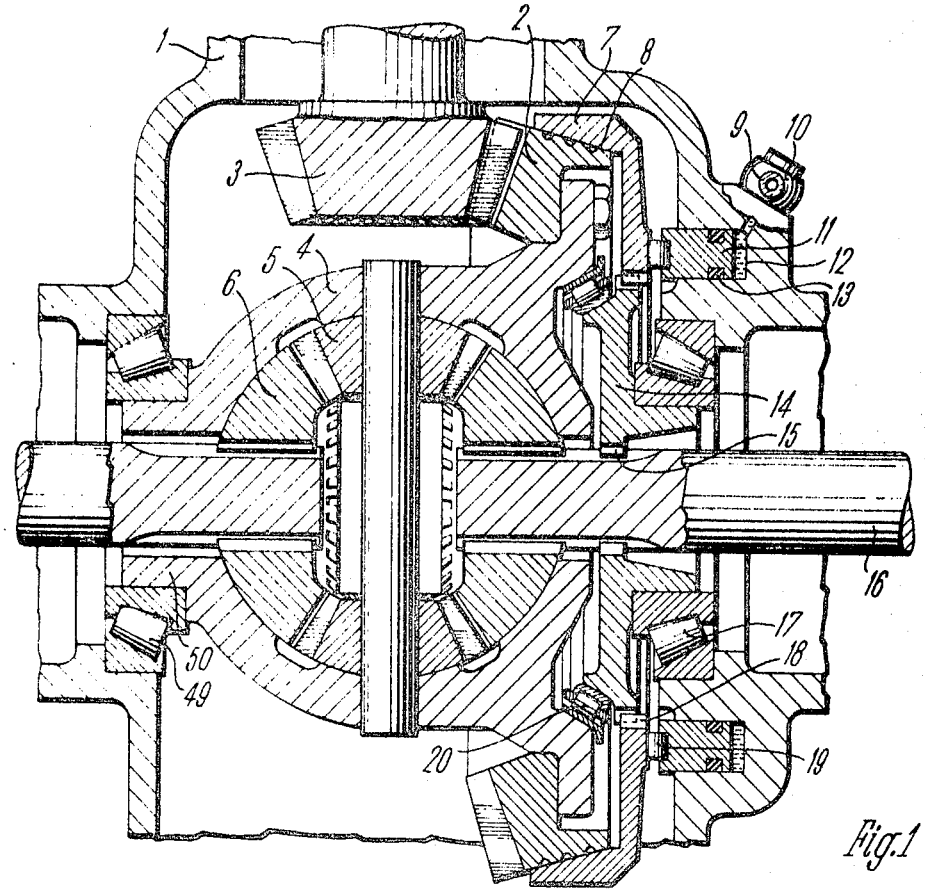

The invention relates to braking, or clutching, devices for differential gears of motor vehicles. Differential gears of motor vehicles have the object to make different rotational speeds of the driving wheels possible when travelling through curves and to transmit the same torque to each of the driving wheels. These gears, however, have the disadvantage that the torque transmitted thereby is limited by the moment which is effective at the driving wheel exerting the lower driving force, because the gears can transmit only twice the moment occurring at this wheel. If, therefore, one of the driving wheels slips on ice, snow or mud so that no torque is transmitted by this wheel, the differential gear does not transmit any driving force to the other driving wheel.

In order to avoid this effect it is known to provide a differential brake, or clutch, which produces friction contact between the differential housing and a wheel driving shaft to clutch these elements together and thus lock up the differential or, in other words, brake one wheel driving shaft relative to the other, so that always a certain torque is effective on a wheel driving shaft even when the associated wheel turns idly, and, therefore, this torque can be transmitted by the gear to the other driving wheel.

In known differential brakes of this kind the brake body is under the effect of a spring so that the brake body is pressed against the brake surface always with the same force. These known differential brakes have the disadvantage that the braking factor can only have a magnitude which is just still permissible with due regard for the driving safety, because the cornering stabilty of the vehicle decreases as the braking factor increases. These known differential brakes are, therefore, not suitable for use with land vehicles and lorries for building operations, since these vehicles must travel a great deal over very rough surfaces, and the braking force of the differential brake must, therefore, be very great. Therefore, in general so-called differential blocking devices are used in these vehicles which completely suppress the effect of the differential gear and which connect the differential housing rigidly directly to the wheel driving shaft, for example by means of a dog clutch thereby transmitting the whole driving moment. These differential gears are admittedly very well suited for the above-mentioned kinds of vehicles as long as they are driven slowly on an ice covered or mud covered surface. If, however, the driver forgets to disconnect the differential blocking device after a good road has been reached, the vehicle does not respond any more to the steering at a high speed, and in the first bend encountered the vehicle drives on in a straight line. As a rule, the surprised driver cannot correct the driving path any more, in particular when the vehicle has an all wheel drive.

Finally, a differential blocking device is known which can be switched on and off by means of a pedal. In this differential blocking device a member connected to the differential housing has a conical surface which is engaged by a conical surface of another member connected to the wheel driving shaft in such manner that the surface lines of the two cones extend in the same direction. The coupling and thus the blocking of the differential gear is effected in that a sleeve with a conical bore is pushed over these two cones which has in the surface of the conical bore roller bearings which extend obliquely to the surface lines and which when the sleeve is pushed over the cones support the pushing-over movement of the sleeve and tighten against the cones. When the pedal is released the sleeve is pushed back again into its starting position by means of a strong spring, and the power transmitting connection between wheel driving shaft and differential housing is thus interrupted. This construction has the disadvantage that it is impossible to insert an intermediate stage in which the whole driving moment is transmitted between the complete blockage of the differential gear and the operative condition in which relative movement between differential housing and wheel driving shaft is not braked. Since the blockage of the differential gear is removed at once when the pedal is released, admittedly switching off the differential blocking device cannot be forgotten. On the other hand, in all probability the driver had no foot free at the instant at which a wheel slips or the vehicle skids, in order to press continuously the actuating lever for this differential blocking device, since as a rule in such difficult positions he must have the one foot on the accelerator pedal and the other foot on the clutch pedal and he grips the steering wheel with both his hands.

The invention has as an object to avoid these disadvantages of the known constructions. The invention consists in that the pressing force with which a displaceable brake member engages a brake surface and thus the force transmitted by the brake, hereinafter referred to as a braking moment, is adjustable to a value which lies between substantially zero and the driving moment which is transmitted by the vehicle motor to the differential gear housing in which the planet wheels are located.

The invention has the advantage that when a difficult part of the road is to be travelled through the braking moment can be adjusted to a value which makes this possible but permits, on the other hand, to steer the vehicle even when the driver forgets to switch-off the braking of the differential gear after the difficult part of the road has been travelled through. Thus the invention increases the driving speed and improves the driving properties of a vehicle to a considerable extent.

In one embodiment of the invention the braking moment, that is to say the pressure with which the displaceable brake section or the brake member engages a stationary brake surface, is adjustable by an operating lever disposed in the operating range of the driver, the lever being constructed as a hand or foot operated lever. This embodiment of the invention has the advantage that the braking moment operative in the differential gear can be changed by the driver at will and steplessly during the travel.

In another embodiment of the invention the braking moment can be adjusted by actuation of an oil pump. The oil pump is actuated until the oil pressure has attained a desirable value which can be read off an indicator instrument.

In a preferred embodiment of the invention, however, the braking moment is controlled automatically in response to wheel slip. This arrangement may be constructed for example similarly as in the case of devices for preventing vehicle brakes from being blocked, because in this case also the sudden change of the rotational speed of a wheel from the nominal rotation speed is used for initiating the control pulses which in this case release the brake acting upon the driving wheel. Such apparatus is produced for example by the firm Maxaret for aircraft brakes. Thus when one of the wheels slips and spins the braking moment is adjusted automatically to a value which depends upon the magnitude of the wheel slip whereby the steering behaviour in such situations is favourably affected. This embodiment of the invention may be developed further in that the device responsive to wheel spin controls the oil pump which produces the pressing force of the brake and thus the braking moment. This automatic switching on and off of the differential brake in accordance with the invention simplifies considerably the operation of the vehicle.

In one embodiment of the invention an operating lever or another device producing the pressing force may be connected mechanically to the brake member, for example also with the intervention of resilient members.

In a preferred embodiment of the invention, however, a hydraulic connection is provided between the operating lever, and the displaceable brake member is displaceable by at least one hydraulic operating cylinder having a piston whose end turned towards the differential gear is adapted to receive roller bearings or slide bearings on which the displaceable brake member is supported. Preferably, an annular piston is provided. This embodiment of the invention is particularly simple and can even be installed at a later date with small constructional expense.

In an embodiment of the invention the hydraulic operating cylinder is connected to a hydraulic master cylinder, the piston of which is displaceable by the operating lever. This embodiment of the invention may be modified further in that a spring is inserted into the power path between the operating lever and the piston of the master cylinder. The hydraulic operating system according to the invention permits uniform loading of all differential braking devices in the case of vehicles which have a plurality of axles each of which is provided with a differential braking device. The spring between the operating lever and the piston of the master cylinder ensures a certain resilience in a simple manner even in the case that co-operating brake members of a differential braking device, e.g. do not run true, and it compensates for leakage losses of the hydraulic system.

In an embodiment of the invention there is provided in the field of view of the driver a device which shows the pressure prevailing in the hydraulic system and which indicates the respective braking factor affecting the differential gear. The driver can, therefore, adjust the braking factor in advance to a certain value. Also, a warning lamp may be provided which after a particularly high braking factor has been obtained reminds the driver that the brake must be switched off.

In an embodiment of the invention the operating cylinder is disposed in the axle casing and the displaceable brake member is also disposed in the axle casing, however outside the differential gear housing. The piston of the operating cylinder affects the displaceable brake member directly by way of roller bearings. In another embodiment of the invention the displaceable brake member is disposed inside the differential gear housing and is non-rotatably connected to a wheel driving shaft. Two axially displaceable pins the outer ends of which rest against a presser ring rotating together with the differential gear housing engage the displaceable brake member by way of bearings in the differential gear housing; the presser ring in turn is supported in the axle casing by the piston of the hydraulic operating cylinder by way of roller bearings.

The differential braking device may be constructed in the form of a conical brake, or, however, in the form of a disc brake, the disc stack of which is compressible by a presser ring which is supported by the piston of the operating cylinder by way of roller bearings.

Further features of the invention will be clear from the following description of embodiments of the invention in conjunction with the claims and the drawings. In an embodiment of the invention the individual features may be realised each by itself or several thereof in combination.

Figure 2:
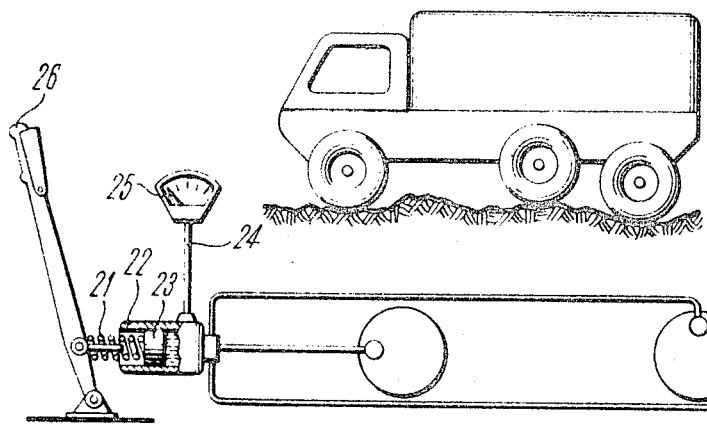
Figure 3:
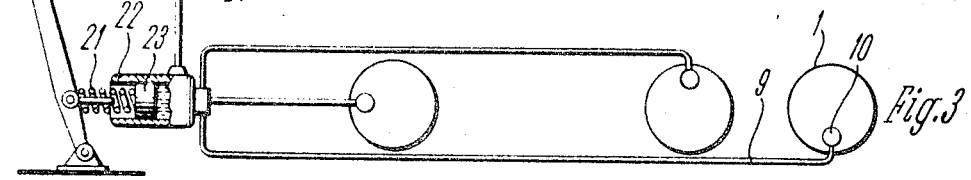
Figure 4:
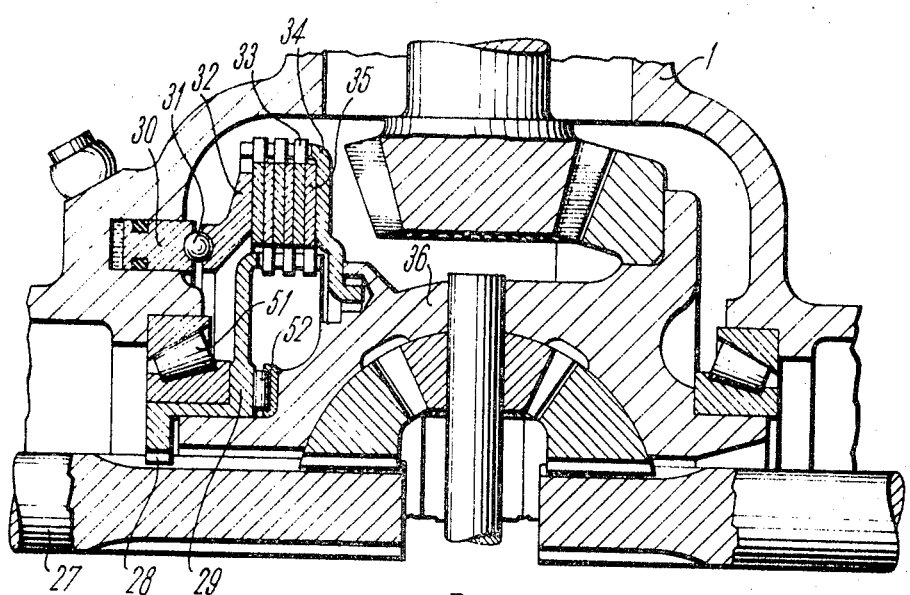
Figure 5:
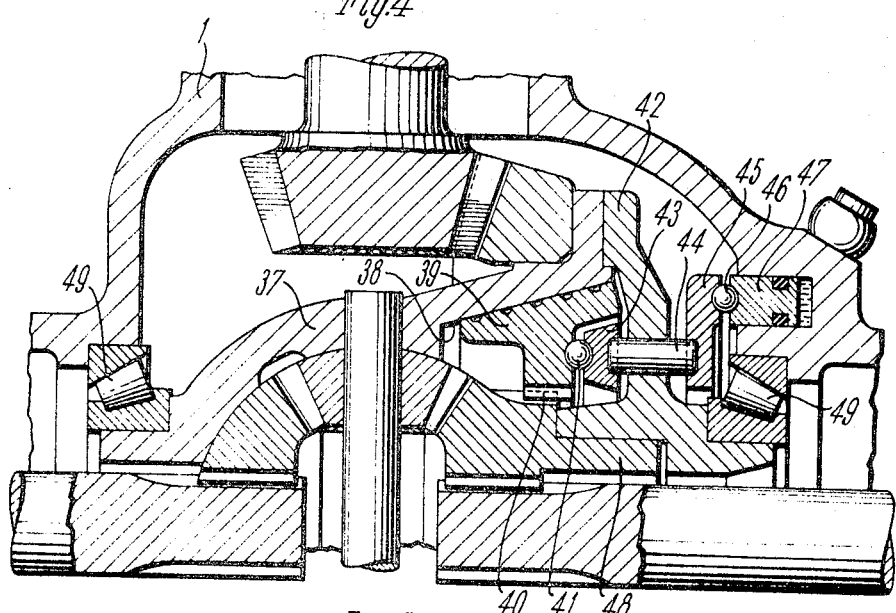

Some embodiments of the invention will now be described by way of example with reference to the accompanying drawings, in which:

FIG. 1 is a section through an embodiment of the differential gear including a braking device according to the invention, FIG. 2 illustrates use of the invention in a land lorry having three axles and all-wheel drive, FIG. 3 illustrates the disposition of the pipes of the hydraulic system, FIG. 4 is a partial section of another embodiment of the invention, and FIG. 5 is a partial section of a still further embodiment of the invention.

In the embodiment of the invention illustrated in FIG. 1 a differential gear housing 4 is rotatably supported in a stationary axle casing 1 by bearings 49 and 17. A crown wheel 2 is attached to the differential gear housing 4 and is enegaged by a pinion 3 which is attached to the end of a transmission shaft and drives the differential gear housing 4. In the differential gear housing 4 planet wheels 5 are rotatably mounted about an axis which is stationary relatively to the differential gear housing, and mesh with differential bevel gears 6 which are non-rotatably connected to half shafts 16 for the driving wheels of the motor vehicle. At the outer peripheral surface of the crown wheel 2 there is provided a conical brake surface 8 which is engaged by a displaceable brake member 7. The brake member 7 has inner teeth 18 which mesh with corresponding outer teeth of an intermediate member 14 and is axially displaceable along these teeth. The intermediate member 14 is non-rotatably connected to the wheel driving shaft 16 by means of internal teeth 15. Between the intermediate member 14 and a running surface of the differential gear housing 4 there are provided roller bearings 20. In the axle casing 1 there is provided a circular groove 12 in which an annular piston 11 is disposed which has seals 13. The space between one end face of the annular piston 11 and the bottom of the groove 12 forms a hydraulic cylinder which is in communication with a connection nipple 10 to which a connecting pipe 9 of the hydraulic system can be connected. The connecting pipe 9 leads to a master cylinder 22, a piston 23 of which can be displaced by a hand lever 26 by way of a spring 21. When the hand lever 26 is operated a force is transmitted through the spring 21 to the piston 23 and thus the fluid pressure in the hydraulic system is increased. An indicator device 25 is connected to the hydraulic system through a connecting line 24 and indicates the respective braking moment set by means of the hand lever 26. The annular piston 11 is provided on its end face turned towards the differential gear with means for receiving roller bearings 19; when the pressure in the hydraulic system is increased the annular piston 11 presses the displaceable brake member 7 by way of the bearings 19 against the brake surface 8. Thus relative movement between the differential gear housing 4 and the wheel driving shaft 16 is opposed in this manner by the braking moment produced at the brake surface 8. This moment is transmitted also to the one driving wheel when the other driving wheel rotates idly or slips.

In the embodiment according to FIG. 3 the assumption is made that a lorry with three axles and all-wheel drive is referred to and that the differential gear of each axle has a differential braking device which is connected to the hydraulic system. The pressure produced in the master cylinder 22 is distributed uniformly to all differential braking devices and since the pressure with which the displaceable brake member is pressed against the brake surface can be varied between zero and a maximum value at which a rigid connection is produced between the brake surface and the displaceable brake member, the braking moment effective on the differential gear can thus be adjusted during travel by means of the hand lever 26 between zero and a value at which the differential gear housing is rigidly connected to the wheel driving shaft.

In the embodiment of the invention illustrated in FIG. 1 the differential gear housing 4 is supported directly in the axle casing 1 by means of roller bearings 49 engaging its neck 50. Bearings 17 disposed at the opposite side in the axle casing 1 guide the intermediate member 14 which in turn supports the differential gear housing 4 by means of the bearings 20.

In the embodiment of the invention illustrated in FIG. 4 the differential braking device is constructed slightly differently from the embodiment according to FIG. 1. A disc 34 attached to a differential gear housing 36 carries brake discs 33 which are non-rotatably but displaceably disposed thereon; co-operating brake discs 35 are non-rotatably but displaceably guided on a flange of an intermediate member 29 which is non-rotatably connected to a wheel driving shaft 27 by means of its internal teeth 28. In the axle casing 1 in turn there is disposed a hydraulically loaded annular piston 30 which affects by way of roller bearings 31 a presser ring 32 which compresses the stack of brake discs. The intermediate member 29 is supported in the axle casing by means of bearings 51 and the differential gear housing 36 is supported by the intermediate member 29 by way of bearings 52.

Whereas in the embodiment according to FIG. 1 a conical brake is provided which engages an outer surface of a component part such as the crown wheel 2 which is non-rotatably connected to the differential gear housing 4, there is provided in the embodiment according to FIG. 4 a disc brake which is disposed outside the differential gear housing 36. The embodiment according to FIG. 5 differs from the preceding embodiments substantially in that a conical brake is provided which engages an inner surface 38 of a differential gear housing 37. A displaceable brake member 39 meshes by means of its inner teeth 40 with corresponding outer teeth of a bevel wheel 48 of the differential gear and is displaceably guided in these teeth, but is otherwise non-rotatably connected to the bevel wheel 48 of the differential gear. Axially displaceable pins 44 are guided in a cover 42 of the differential gear housing 37, and their rearward end faces lie against a presser ring 45 which is affected by way of roller bearings 46 by an annular piston 47 which is hydraulically loaded and is disposed in a groove of the axle casing 1. The forward end faces of the axially displaceable pins 44 in turn rest against a presser ring 43 which affects the displaceable brake member 39 by way of roller bearings 41. Hydraulic pressure exerted on the annular piston 47 affects thus by way of the path 46, 45, 44, 43, 41 directly the displaceable brake member 39 and determines the braking moment produced by the displaceable brake member 39 and the brake surface 38.

In the embodiment according to FIG. 5 the differential gear housing is guided at both its necks directly in the axle casing 1 by way of bearings 49.

This piston 23 or also directly the annular piston 11, 30, 47 can be controlled by an oil pressure cylinder which in turn is actuated by an oil pump. Alternatively this oil pump may affect directly the annular pistons 11, 30, 47. It may be controlled by measuring devices which respond to wheel slip.

What is claimed is:

1. A blocking automotive differential gear arrangement with a driven differential housing rotatably supported in the axle casing by way of bearings, bevel gear wheels drivingly mounted on the opposed ends of two wheel drive shafts and in driving engagement with planetary gear wheels, and clutch means for blocking the differential gear arrangement, wherein the improvement comprises: said clutch means having one clutch friction surface drivingly connected with the differential housing and another clutch friction surface drivingly connected to one of the wheel drive shafts; said clutch means being disposed between said axle casing and said differential housing; said clutch means having fluid piston means for selectively engaging said friction surface and cylinder means formed by said axle casing receiving therein said fluid piston means; said clutch means including an annular clutch element forming one of said friction surfaces and having an anti-friction bearing race; said fluid piston being annular and having an anti-friction bearing race; and roller means engaging between said races; the clutch means includes a movable clutch member having one of the friction surfaces and drivingly connected to one of the shafts for axial movement with respect thereto, an axially movable operator member within the differential housing, anti-friction bearing means between the operator member and the clutch element within the differential housing, pin means axially movable with respect to and extending through the differential housing for engaging the operator member, and anti-friction bearing means between said annular piston means and said pin means.

2. The arrangement according to claim 1, wherein said clutch means selectively produces a torque infinitely variable within a range between zero and at least the value of the driving torque applied to the differential gear housing.

3. The arrangement according to claim 2, said system including indicator means for visually indicating to the driver the fluid pressure within said system.

4. A blocking automotive differential gear arrangement with a driven differential housing rotatably supported in the axle casing by way of bearings, bevel gear wheels drivingly mounted on the opposed ends of two wheel drive shafts and in driving engagement with planetary gear wheels, and clutch means for blocking the differential gear arrangement, wherein the improvement comprises: said clutch means having one clutch friction surface drivingly connected with the differential housing and another clutch friction surface drivingly connected to one of the wheel drive shafts; said clutch means being disposed between said axle casing and said differential housing; said clutch means having fluid piston means for selectively engaging said friction surfaces and cylinder means formed by said axle casing receiving therein said fluid piston means; a closed hydraulic system including said piston and cylinder means; said system including a pressurizing piston-cylinder; hand lever means for operating said pressurizing piston-cylinder for in turn actuating said piston-cylinder means for actuating said clutch means; spring means in the power path between said hand lever means and said pressurizing piston-cylinder.

5. The arrangement according to claim 4, said clutch means including an annular clutch element forming one of said friction surfaces and having an anti-friction bearing race; said fluid piston being annular and having an anti-friction bearing race; and roller means engaging between said races.

6. The arrangement according to claim 4, wherein said clutch means selectively produces a torque infinitely variable within a range between zero and at least the value of the driving torque applied to the differential gear housing.

References Cited

UNITED STATES PATENTS

| | | |
|---|---|---|
| 535,264 | 3/1895 | Smith. |
| 1,506,915 | 9/1924 | Minthorn _____ 74—710.5 |
| 1,791,198 | 2/1931 | Focher _____ 74—710.5 |
| 2,620,055 | 12/1952 | Fasulo _____ 74—710.5 X |
| 2,894,416 | 7/1959 | Scott _____ 74—710.5 |
| 2,913,928 | 11/1959 | Double _____ 74—710.5 |
| 3,191,708 | 6/1965 | Simonds et al. ____ 74—710.5 X |
| 3,306,408 | 2/1967 | Kahle. |
| 2,627,725 | 2/1953 | Cochrane et al. |
| 2,890,687 | 6/1959 | Richmond. |
| 3,157,257 | 11/1964 | Root. |

FOREIGN PATENTS

| | | |
|---|---|---|
| 1,158,997 | 2/1958 | France. |
| 858,528 | 1/1961 | Great Britain. |
| 911,448 | 11/1962 | Great Britain. |

DONLEY J. STOCKING, Primary Examiner

THOMAS C. PERRY, Assistant Examiner

U.S. Cl. X.R.

192—109